No. 769,468. PATENTED SEPT. 6, 1904.
J. A. CARLSON.
HARVESTING MACHINE.
APPLICATION FILED AUG. 8, 1903.
NO MODEL. 10 SHEETS—SHEET 1.

FIG. 1.

WITNESSES
INVENTOR
JOHN A. CARLSON
BY Paul & Paul
HIS ATTORNEYS

No. 769,468. PATENTED SEPT. 6, 1904.
J. A. CARLSON.
HARVESTING MACHINE.
APPLICATION FILED AUG. 8, 1903.
NO MODEL. 10 SHEETS—SHEET 6.

WITNESSES
INVENTOR
JOHN A. CARLSON
BY Paul & Paul
HIS ATTORNEYS

No. 769,468. PATENTED SEPT. 6, 1904.
J. A. CARLSON.
HARVESTING MACHINE.
APPLICATION FILED AUG. 8, 1903.
NO MODEL. 10 SHEETS—SHEET 9.

WITNESSES

INVENTOR
JOHN A. CARLSON
BY
HIS ATTORNEYS

No. 769,468. PATENTED SEPT. 6, 1904.
J. A. CARLSON.
HARVESTING MACHINE.
APPLICATION FILED AUG. 8, 1903.
NO MODEL. 10 SHEETS—SHEET 10.

WITNESSES
INVENTOR
JOHN A. CARLSON
BY Paul & Paul
HIS ATTORNEYS

No. 769,468. Patented September 6, 1904.

UNITED STATES PATENT OFFICE.

JOHN A. CARLSON, OF HALLOCK, MINNESOTA.

HARVESTING-MACHINE.

SPECIFICATION forming part of Letters Patent No. 769,468, dated September 6, 1904.

Application filed August 8, 1903. Serial No. 168,696. (No model.)

*To all whom it may concern:*

Be it known that I, JOHN A. CARLSON, a citizen of the United States, residing at Hallock, in the county of Kittson, State of Minnesota, have invented a certain new and useful Harvesting-Machine, of which the following is a specification.

My invention relates to harvesters or reapers of the "low-down" type wherein the cutting mechanism has a revolving instead of reciprocating movement.

The objects of my invention are, first, to provide a machine that will dispense with all canvas carriers usually employed on machines of this kind; second, to do away with all vibration resulting from the employment of the ordinary reciprocating movement and provide a machine of cheap construction and light draft and one that can be easily operated.

Other objects of the invention will appear from the following detailed description.

The invention consists generally in various constructions and combinations, all as hereinafter described, and particularly pointed out in the claims.

In the accompanying drawings, forming part of this specification, Fig. 4 is a section on the line $y\ y$ of Fig. 3.

In the drawings, 2 represents a frame, preferably of angle-iron, provided with the usual draft-pole 3 and seat 4, the latter being within convenient reaching distance of the lever mechanisms that control the movement of the various operating parts of the machine.

5 is the main or "bull" wheel, usually so called, loosely mounted on an axle 6, that is vertically movable between the rack-bars 7 and the guide-bars 8, mounted in frames 9, and said axle has pinions 10 secured thereon, engaging the teeth of said bars. A sprocket 11 is secured to said wheel and is connected by a chain 12 with a sprocket 13, loosely mounted on a drive-shaft 14, that has suitable bearings on the frame 2. The sprockets 11 and 13 and the chain connecting the same will operate continuously while the machine is in motion; but the drive-shaft 14 will be operated only as the attendant moves the clutch mechanism, as hereinafter described. The sprocket 13 is provided with one member 15 of a clutch whose opposite member 16 is splined on the shaft 14 and is normally held toward said first-named member by a spring 17. A sleeve 18 is loosely mounted on the shaft 14, and upon said sleeve sprockets 19 and 20 and a ratchet 21, arranged between them, are secured. A clutch member 22 is also secured on said sleeve, the other member, 23, being splined on said shaft. A chain 24 connects the sprocket 19 with a similar sprocket secured on the axle 6. A bell-crank 25, mounted on the frame 2, has one arm in engagement with the clutch member 16 and its other arm connected with an operating-rod 26, that extends to the opposite side of the frame within convenient reach of the attendant. The spring 17 normally tends to hold the clutch members together and lock the sprocket 13 on its shaft; but whenever desired the clutch members may be disengaged to allow the sprocket 13 to revolve without operating the shaft 14.

Figure 1:
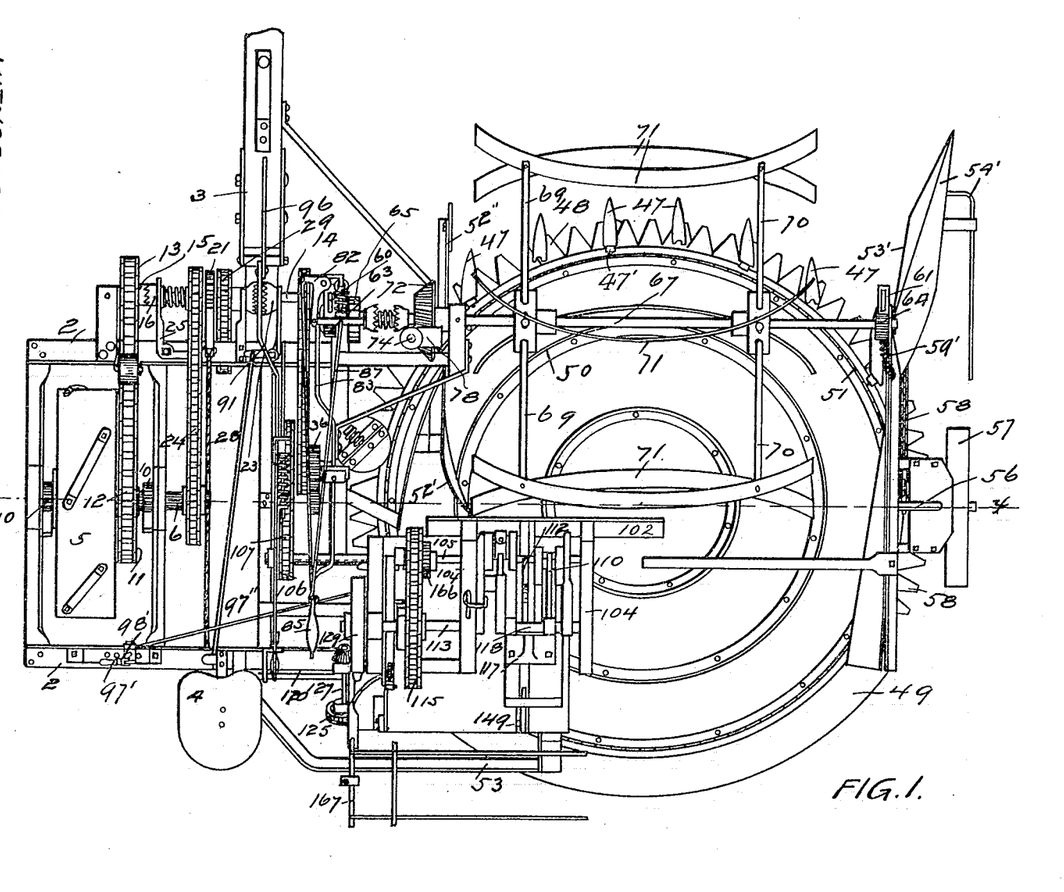
Figure 1 is a plan view of a harvesting-machine embodying my invention.

A mechanism is provided for operating the clutch member 23, similar to that heretofore described with reference to the clutch member 16. A dog 27 is arranged to engage the teeth of the ratchet 21 and prevent backward movement of said drive-shaft, and a cord 28 is connected with said dog for convenience in operating it from the other side of the machine. A chain 29 connects the sprocket 20 with a sprocket 30 on a horizontal shaft 31, that is mounted in bearings in the frame 2 and in an upright rectangular frame 32, provided at the opposite end of the machine. A sprocket 33 is secured on the drive-shaft 14 and connected by a chain 34 with a sprocket 35, mounted on the shaft 36 of an idle gear 36', that meshes with a pinion 37 on a shaft 38. This shaft 38 has a bearing at one end in the frame 2 and extends beneath a horizontal circular platform 39, that is arranged to revolve on a stud 40, mounted in a block 41 between curved brace-bars 42. The other end of the shaft 38 is supported in a bearing between the brace-bars 42 and is provided with a beveled gear 43, that engages the teeth of a similar gear 44, secured to the under side of the platform 39 and concentric with the stud 40. The revolution of the shaft 38 will cause the platform 39 to revolve in a horizontal plane. A curved frame 45, preferably of angle-bars, is arranged beneath the revolving platform and near the circumference thereof, and on the forward side of the machine the frame 45 is provided with a series of stationary triangular knives 46 and knife-guards 47 of the ordinary construction. Some of these guards, as shown in Fig. 1, are provided with antifriction-rollers 47', with which the revolving platform contacts. The platform 39 is provided on its periphery with a series of knives 48, that coöperate with the edges of the stationary knives to cut the grain as the machine is advanced. The frame 45 at the rear of the machine is provided with a guard 49, that overhangs the knives, concealing and protecting them in their inoperative position. I prefer to provide the revolving platform 39 with a series of circular ribs 50, projecting vertically above the upper surface of the same and arranged one within the other, the outer rib being near the periphery of the platform and provided with a series of notches 51, which receive the butts of the grain-straw and prevent the same from slipping on the platform as it revolves. An inclined plate 52 is provided above the revolving platform, supported upon an angle-bar frame 53 and having notches 54 to receive the ribs 50, the lower edge of said plate being sufficiently near the revolving platform to engage the grain as it is brought around and direct it toward the packing and binding mechanism, as will hereinafter appear. A curved guide 52' is arranged to direct the grain upon the plate 52, and boards 52" and 53' are provided to direct the grain toward the knives and platform. An arm 54' directs the uncut grain away from the wheel 57.

The frame 32 is provided with arms 55, that support a vertically-arranged rod 56, that has its lower end outwardly turned to form a bearing for a wheel 57, and its upper end is inwardly turned, to which one end of a chain 58 is attached, its other end being connected to the shaft 31. The operation, therefore, of the clutch member 23 to lock the sleeve 18 will cause the revolution of the axle 6 to raise the frame 2 at one side of the machine, while the simultaneous operation of the shaft 31 through its chain connection 29 with the sprocket 20 will wind the chain 58 around the shaft 31 and simultaneously raise the other side of the machine-frame. Upon disengaging the dog 27 from its ratchet the drive-shaft and its connections may be revolved backward, and the weight of the machine-frame will cause it to drop to the desired level.

Figures 8, 9, 10:
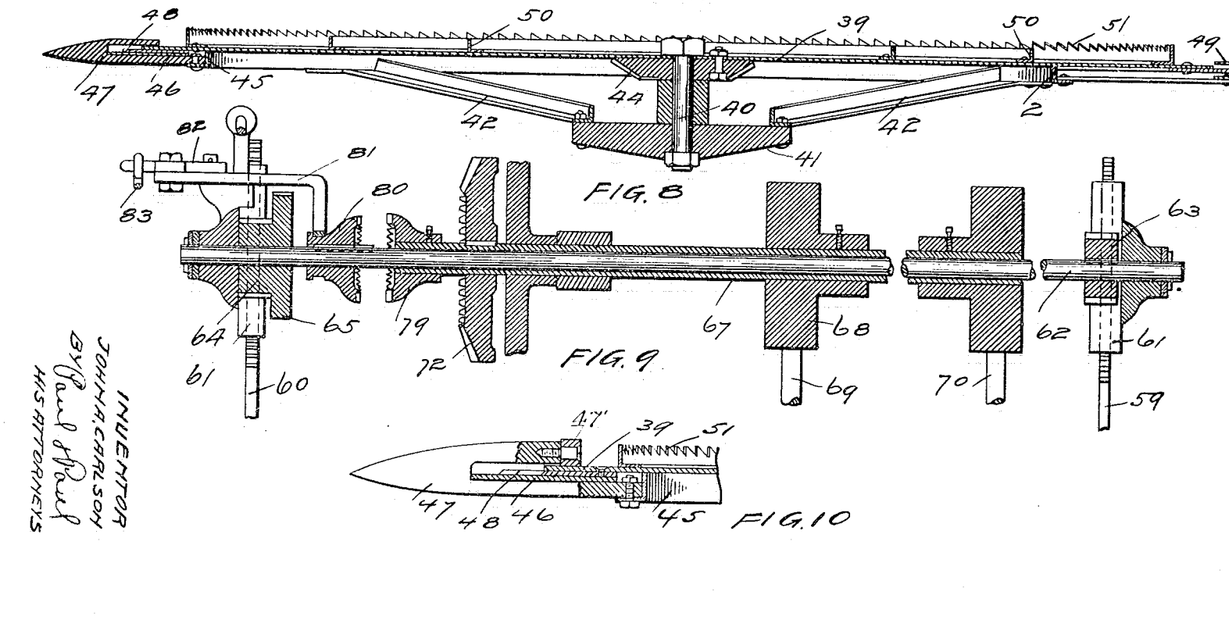
Fig. 8 is a vertical section through the revolving platform.
Fig. 9 is a detail section of the shaft and its connections whereon the revolving reel is supported.
Fig. 10 is a detail, partially in section, showing one of the knife-guards with the antifriction-roller thereon.
Figure 11:
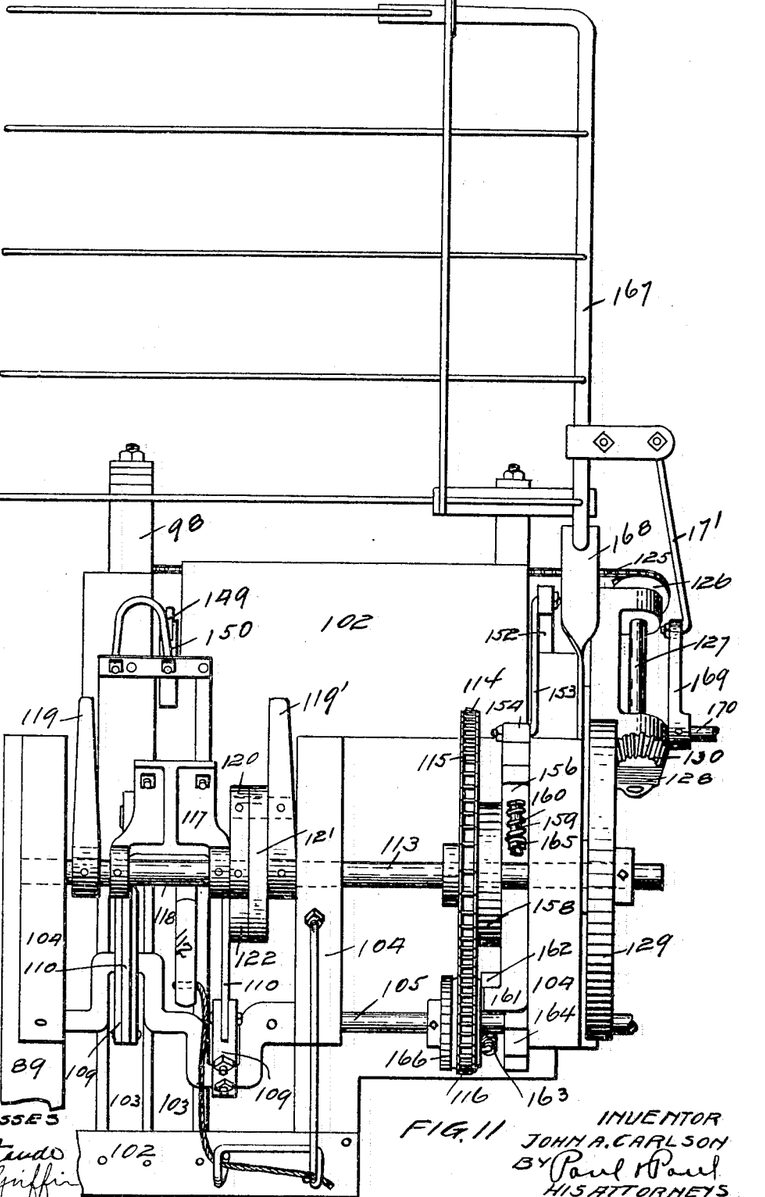
Fig. 11 is a plan view of the knotter mechanism.
Figure 12:
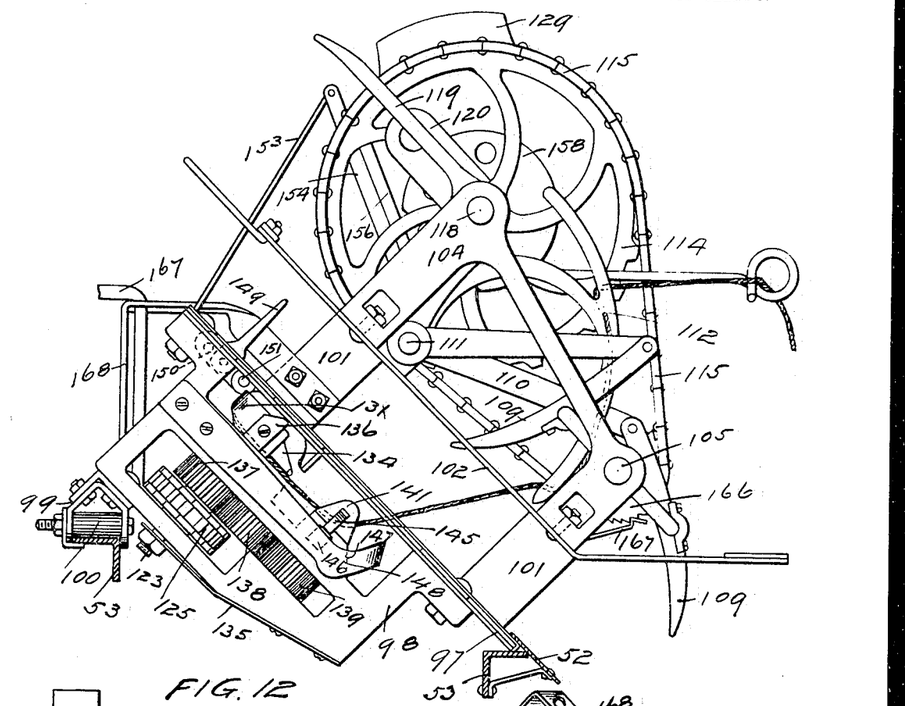
Fig. 12 is an end elevation of the knotter mechanism, showing the supports whereon it is adjustable.
Figures 13, 16, 17:
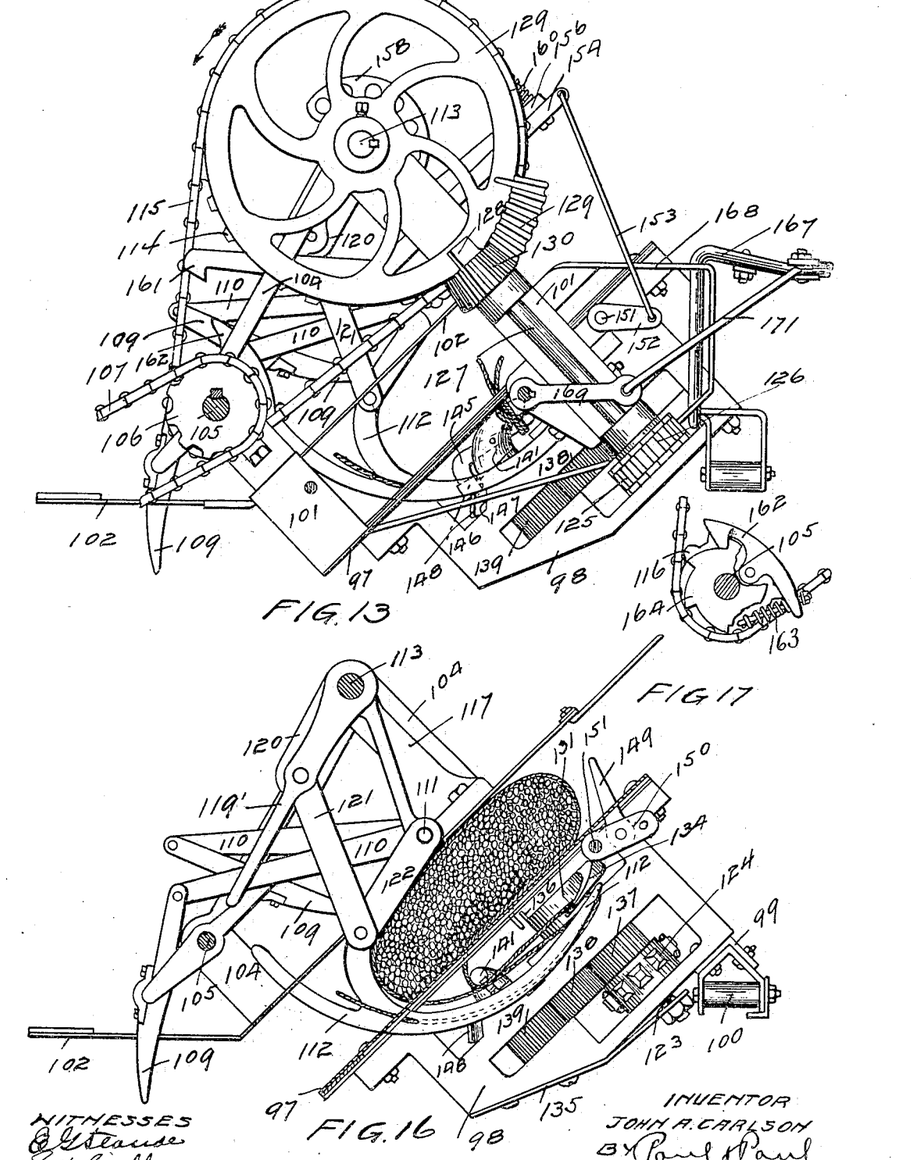
Fig. 13 is a similar view of the opposite end of the knotter mechanism, showing the needle in its depressed position.
Fig. 16 is a detail of the knotter, showing the mechanism in the act of forming the knot.
Fig. 17 is a detail of the clutch mechanism that controls the movement of the knotter operating-shaft.
Figures 14, 15:
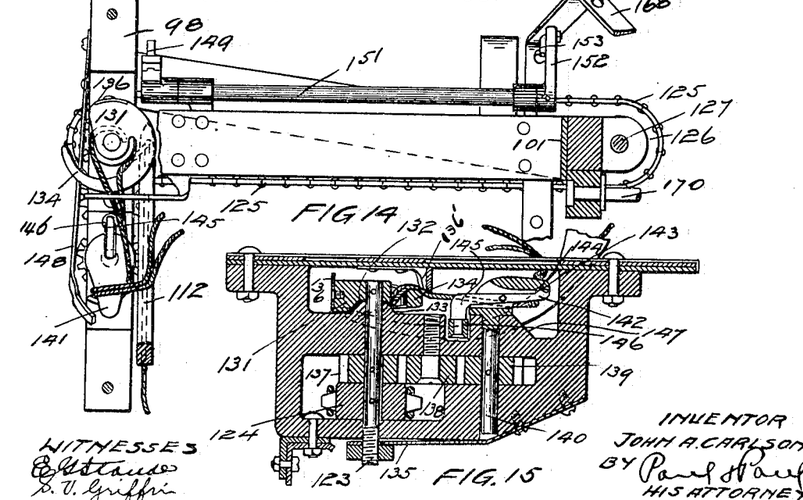
Fig. 14 is a detail of the knotter and the cord disk or holder, showing their relative positions.
Fig. 15 is a sectional view of the same.

At the forward side of the machine I provide upright pivoted rack-bars 59 and 60, upon which boxes 61 are slidably arranged, wherein the ends of a shaft 62 are mounted. (See Fig. 9.) A spring 59' connects the bar 59 with the frame 32. 63 and 64 are pinions secured on said shaft and arranged to engage the teeth of the rack-bars 59 and 60, respectively, through openings in the boxes 61. A ratchet 65 is provided on the pinion 64, and a pawl 66 normally engages the teeth of said ratchet and prevents revolution of the shaft in one direction. A sleeve 67 is loosely mounted on the shaft 62, and hubs 68, secured on the said sleeve, are provided with radiating spokes or fingers 69 and 70, that are connected at their outer ends by bows 71, which, with the spokes and hubs, form a reel for directing the cut grain to a horizontal position on the revolving platform. I prefer to provide bows between the spokes of the reel to conform, substantially, to the curved periphery of the revolving platform and to facilitate the placing of the grain thereon. The reel is operated independently of the shaft 62, and I prefer to secure a beveled gear 72 on the sleeve 67 and arrange it to mesh with a similar gear 73 on a vertical shaft 74, that is provided at its lower end with a beveled pinion 75, meshing with a similar pinion 76 on the drive-shaft 14. A suitable box 77 is preferably arranged to inclose the gears 75 and 76. The upper end of the shaft 74 is preferably supported in a yoke 78, that is vertically slidable on the said shaft to permit raising or lowering of the reel. To operate the shaft 62 simultaneously with the reel, I prefer to secure a clutch member 79 on the sleeve 67 and spline the other member, 80, of the clutch on the shaft 62. A forked arm 81 is arranged to engage the clutch member 80 and is connected with one arm of a pivot bell-crank 82, that is connected by a rod 83 with a bell-crank 84, pivoted on the under side of a lever 85. A similar bell-crank 86 is pivoted on the upper side of said lever and connected by a rod 87 with the locking-pawl 66. By moving the levers 84 and 86 toward each other the operator can simultaneously disengage the pawl 66 from its ratchet, throw the clutch member 80 into engagement with the other member 79, and revolve the shaft 62 to raise the reel. The lever 85 is connected at one end with the shaft 62 and is slidable in a slot 88, provided in a standard 89, and said lever has a series of teeth 90 to engage the lower end of the slot 88 and lock the said lever against longitudinal movement. As heretofore stated, the rack-bars 59 and 60 are pivotally supported at their lower ends, and hence movement of the lever 85 longitudinally will cause the said rack-bars to swing on their pivots and advance or withdraw the reel to change its position with respect to the forward edge of the revolving platform. It is sometimes desirable to raise or lower the pole of the machine, and I therefore provide a lever 91, pivotally supported on an upright bar 92 and having a spring-actuated latch 93, arranged to engage the teeth of a quadrant 94. A bell-crank 95 is connected by a rod 96 with said latch to enable the operator to lock and unlock the lever. The forward end of the lever 91 is adjustably connected to the upper end of a bar 96, whose lower end is attached to the pole.

I have heretofore described the revolving knife-carrying platform and the mechanism for raising and lowering the same, and I have also described the revolving reel device, with its raising and lowering means, and I will now proceed to describe the mechanism for gathering the grain into a bundle, passing the twine around the same, and tying a knot therein. (See Figs. 11 to 18.)

97 represents an inclined table arranged to form a continuation of the plate 52 and slidably supported at its lower edge on the inner rail of the frame 53. The knotter-frame 98 is secured to the under side of said table and is provided with a bracket 99, wherein an antifriction-roller 100 is mounted and arranged to roll upon the outer rail of the frame 53. The table 97 is thus adjustable toward and from the center of the revolving platform to adapt the binding mechanism to grain of different lengths. I prefer to provide a lever 97', mounted on the machine-frame and connected with the adjustable table by means of a link 97" and having a locking device 98'. By means of this lever the operator can move the table 97 back and forth to adjust it with respect to the revolving platform. Upon the table 97 are standards 101, supporting a plate 102, that is provided with a series of longitudinal slots 103, forming a grating over said table. The inner end of the plate 102 is upwardly turned to form a guide for the grain and direct it into its proper position upon the table 97. A frame 104 is mounted upon the plate 102, and wherein a multiple crank-shaft 105 is journaled. A sprocket 106 is splined on said crank-shaft and connected by a chain 107 with a sprocket 108 on the shaft 36, which in turn is connected by the chain 34 with the drive-shaft 14. Packer-arms 109 are mounted on said crank-shaft and connected by links 110 with a shaft 111, whereon the needle-bar 112 is mounted. A shaft 113 is also mounted in bearings in the frame 104 and provided with a sprocket-wheel 114, connected by a chain 115 with a sprocket-wheel 116, loosely mounted on the crank-shaft 105. Mounted on the plate 102 is a standard 117, wherein a rock-shaft 118, carrying a bundle-discharge arm 119, is journaled, the other corresponding arm 119' being mounted on the shaft 113. A crank 120 is provided on the shaft 118 and connected with the arm 119', and a link 121 connects the crank 120 and arm 119' with a crank 122, mounted on the shaft 111. An oscillating movement will thus be imparted to the arms 119 and 119' to discharge the bound bundles from the table 97.

The grain as it is cut and falls upon the revolving platform will be carried around and conveyed by the movement of the platform up over the plate 52 and the table 97, where it will be engaged by the loop in the twine in the usual way and held until a certain predetermined amount of grain has accumulated upon the platform. As soon as a bundle of the desired size has been formed, a knot will be made in the twine and the bundle discharged. The mechanism for holding the twine and forming the knot therein and releasing the mechanism to discharge the bundle I will now proceed to describe. (See Figs. 12 to 15.)

A shaft 123 is mounted in bearings in the frame 98 and provided with a sprocket 124, connected by a chain 125 with a similar sprocket 126 on a shaft 127. A pinion 130 is mounted on the shaft 127 in position to engage a mutilated gear 129 at a certain predetermined point in its revolution and has a long tooth 128, that enters a corresponding groove in the gear when it meshes with the pinion. When the pinion is out of mesh with the gear, the long tooth prevents it from turning. With each revolution of the shaft 113 and its mutilated gear the shaft 123 will be operated also. Upon the shaft 123 I arrange a twine-holder 131, having a recess 132 in its under side to receive a conical surface 133 and form a close joint therewith. A curved finger 134 is provided on the twine-holder to engage the twine, the end of which is caught between the conical surface and the twine-holder, and said surfaces are yieldingly held together by means of a spring 135. (See Figs. 12, 15, and 16.) A knife 136 is mounted on the twine-holder in position to cut the twine after the knot has been formed, and a fixed plate 136' is arranged to draw the twine taut over the finger 134 while it is being cut.

137 is a gear fixed on the shaft 123 and meshing with an idle gear 138, which in turn engages a gear 139, secured on the knotter-shaft 140. The upper end of this shaft 140 is provided with a knotter-bill 141, wherein a finger 142 is pivoted, said finger having a knob or projection 143 adapted to enter a recess 144 in said bill and prevent the twine from slipping out of the knotter during the operation of forming the knot, Fig. 15. The finger 142 is provided with a depending end 145, having an antifriction-roller 146, that is adapted to engage an inclined cam-surface 147 and oscillate the finger 142 to separate it from the knotter-bill and allow the twine to pass between them. A spring 148 is provided to engage the roller 146 when it leaves the surface 147 and hold the finger in engagement with the knotter-bill and prevent the twine from slipping out from between them during the operation of forming the knot. A finger 149 projects above the table 97 and is secured to a crank 150, mounted on a rock-shaft 151 beneath said table. The finger 149 projects into the path of the grain as it accumulates on the table and is operated by the pressure of the grain to rock said shaft when a sufficient quantity has accumulated to form a bundle. An arm 152 is mounted on the opposite end of the shaft 151 from the finger 149 and is connected by a link 153 with a lever 154, that is pivoted on a lug 155, that depends from a pivoted lever 156. The inner end of the lever 156 is upwardly turned and provided with an antifriction-roller 157, arranged to engage a cam-faced disk 158, secured on the shaft 113. The outer end of the lever 154 is provided with a pin 159, that passes through the corresponding end of the lever 156 and is provided with a spring 160, that tends to hold the outer ends of said levers together. The inner end of the lever 154 is provided with a hook 161, that normally engages a pawl 162, pivoted on the loosely-mounted support 116 and pressed by a spring 163 toward the teeth of a ratchet 164, that is secured on the shaft 105.

Figures 2, 18:
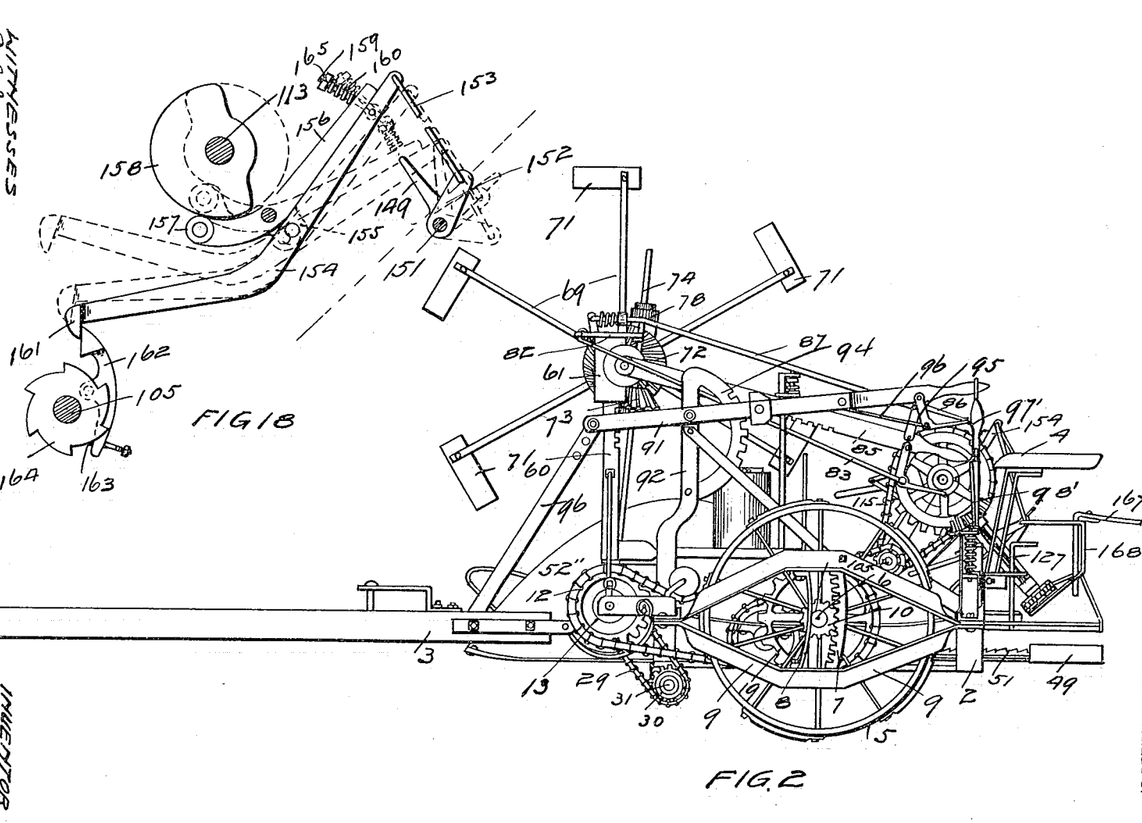
Fig. 2 is a side elevation of the same.
Fig. 18 is a detail of the mechanism that is operated by the pressure of the grain to release the knot-forming mechanism.
Figure 3:
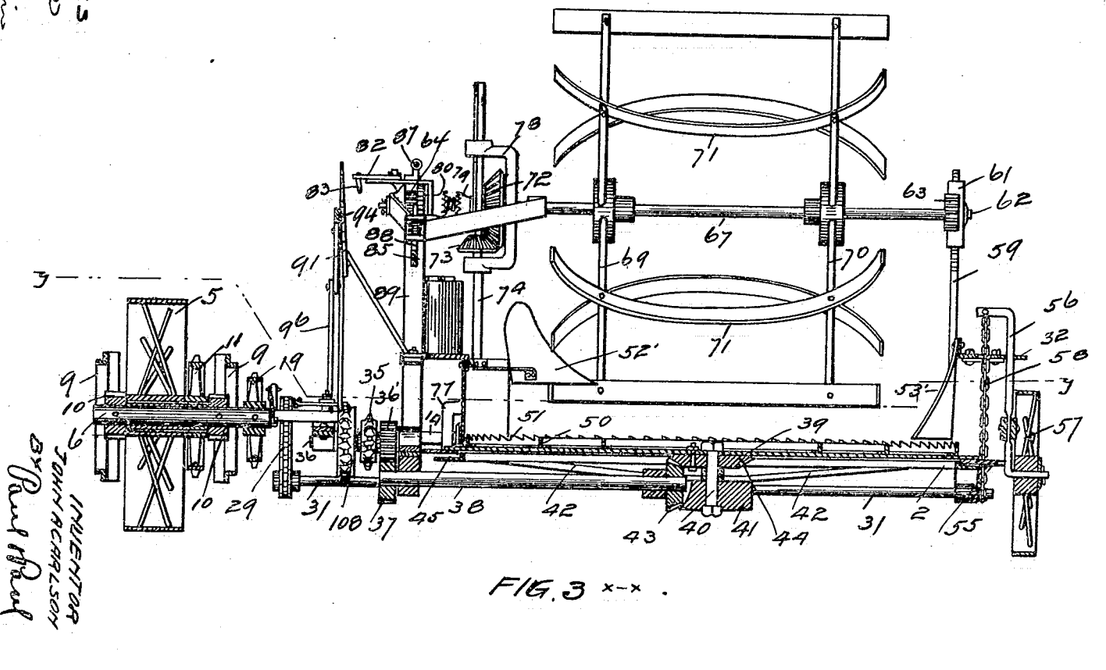
Fig. 3 is a section on the line $x\ x$ of Fig. 1. Fig. $3^a$ is a vertical section on a line substantially at right angles to the section-line $x\ x$ of Fig. 1.
Figure 5:
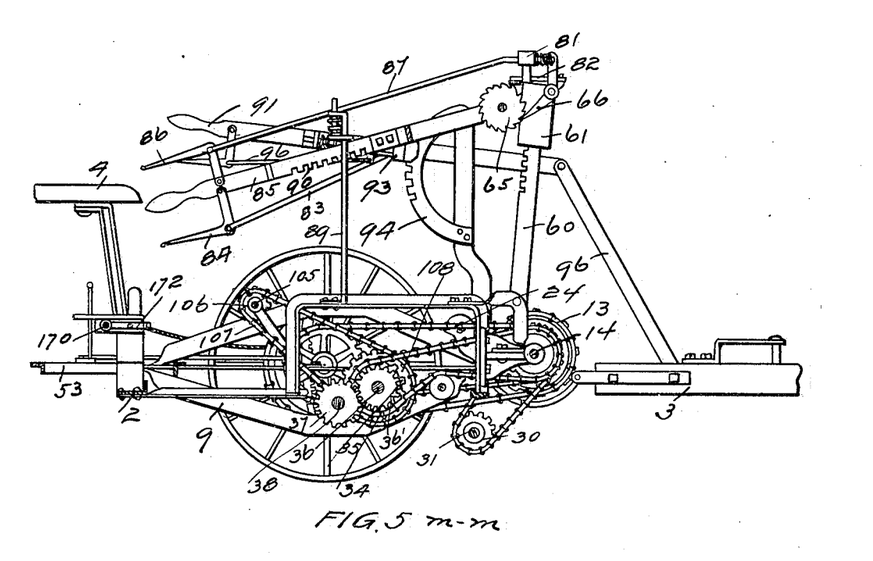
Fig. 5 is a section on the line $m\ m$ of Fig. 4.
Figure 6:
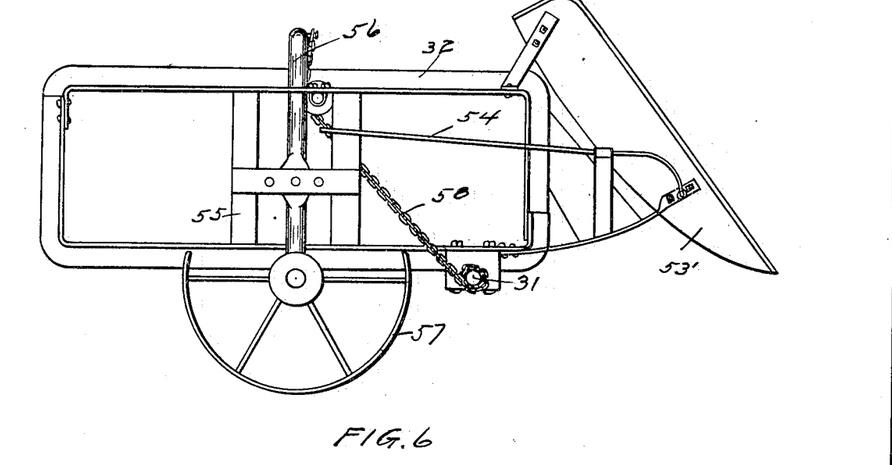
Fig. 6 is a detail looking toward one side of the machine and showing the mechanism for raising or lowering the revolving platform.
Figure 7:
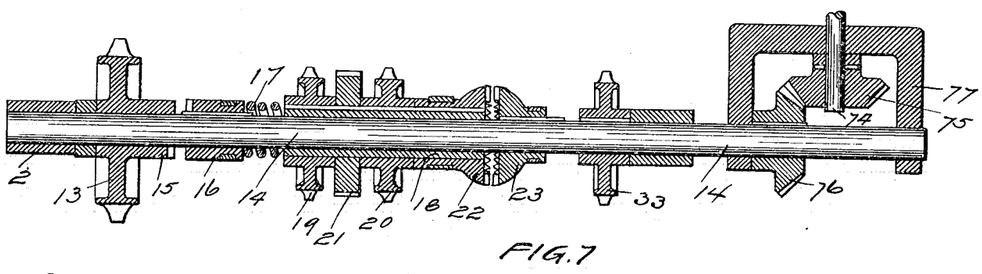
Fig. 7 is a detail section of the main driving-shaft and its connections.

As indicated in Fig. 18, the pawl 162 is normally held out of engagement with the teeth of the ratchet when the knotter mechanism is inoperative and while the grain is accumulating on the table and the bundle is being formed, the shaft 113 being stationary at this time. As soon, however, as the finger 149 is oscillated by the pressure of the bundle of grain the lever 154 will be tripped to release the pawl 162. The spring 163 will then force the pawl into engagement with the teeth of the ratchet 164 and lock the sprocket 116 on the shaft 105. The sprocket 116 will be locked on the shaft and the shaft 113 will be set in motion, and the cam-disk 158, engaging the roller 157, will hold the lever 156 against the tension of the spring 160, which has previously been compressed by the tripping of the lever 154. As soon, however, as the cam-disk passes the inner end of the lever 156, the said lever will drop to the position indicated by dotted lines in Fig. 18 and allow the lever 154 to drop to its dotted-line position and permit the finger 149 to be depressed sufficiently to allow the bundle to be discharged from the table 97. By means of the nut 165 the tension of the spring 160 may be regulated to vary the resistance of the lever 154 to the pressure of the finger 149 and regulate the size of the bundles of grain. The bundle having been bound and the finger 149 depressed sufficiently to allow its discharge, the arms 119 and 119' will engage the bundle and discharge it from the table. The finger 149, being relieved of the pressure of the grain, will be returned to its normal position, when the cam 158 again engages the roller 157 and the hook 161 will be depressed sufficiently to engage the pawl 162 and disengage the same from the ratchet, whereupon the shaft 113 will become stationary until sufficient grain has again accumulated on the table to form a bundle, when the operation will be repeated. The shaft 105 is prevented from turning backward by means of a ratchet 166 and a spring 167 engaging the same.

As the bundles are discharged from the table 97 they are deposited upon a rack 167, pivotally supported on a bracket 168 and arranged to be swung to an operative position in the rear of the table 97 or to an inoperative position at one side thereof by means of a crank 169, mounted on a rock-shaft 170 and connected with the carrier 167 by a link 171. The shaft 170 extends along beneath the seat 4 and is provided with a foot operating-crank 172.

I claim as my invention—

1. The combination, with a wheeled frame and a series of fixed knives arranged on the arc of a circle thereon, of a revolving platform horizontally mounted on said frame, knives provided on the periphery of said platform and arranged to coöperate with said fixed knives, a series of ribs concentrically arranged on the surface of said platform, and a fixed inclined plate arranged above said platform for gathering up the grain as it falls upon said ribs.

2. The combination, with a wheeled frame, of a revolving circular platform horizontally arranged thereon near the ground-line, fixed and movable knives provided respectively on said frame and platform, a fixed plate arranged at an incline and having its lower edge near the surface of said platform, and an inclined grain-table provided above said platform and adjustable lengthwise with respect to said plate, for the purpose specified.

3. The combination, with a wheeled frame, of a revolving platform horizontally mounted thereon, fixed and movable knives provided respectively on said frame and platform, a series of ribs concentrically arranged on the surface of said platform, and a fixed inclined plate supported above said platform, the lower edge of said plate being below the upper edge of said ribs, for the purpose specified.

4. The combination, with a rectangular angle-bar frame 2 provided with suitable carrying-wheels, of a revolving platform horizontally mounted at one end on said frame, fixed and movable knives provided respectively on said frame and platform, a frame 53 secured on said frame 2 and overhanging said revolving platform, a horizontally-adjustable grain-receiving table slidably mounted on said frame 53 and adapted to be moved over said platform to adapt the machine for grain of different lengths, a binding and knotting mechanism operating in connection with said table, and a lever mechanism within control of the operator for adjusting said table on said frame 53.

5. The combination, with a suitable frame and a series of fixed knives arranged on the arc of a circle, of a revolving platform horizontally mounted on said frame, knives provided on the periphery of said platform and arranged to coöperate with said fixed knives, and a series of ribs concentrically arranged on the surface of said platform, the outer rib having a series of notches, for the purpose specified.

6. The combination, with a wheeled frame, of a revolving platform horizontally arranged thereon, fixed and movable knives provided respectively on said frame and said platform, ribs concentrically arranged on said platform, an inclined table arranged over said platform in position to receive the grain therefrom, a plate having notches to receive said ribs and direct the grain upon said table and a binder mechanism operating in connection with said table, substantially as described.

7. The combination, with a frame provided with carrying-wheels, of a revolving platform horizontally mounted thereon at one end, fixed and movable knives provided respectively on said frame and platform, a frame 53 mounted on said first-named frame and overhanging said platform, an inclined plate 52 secured on said frame 53 and having its lower edge near said platform, a grain-table slidably mounted on said frame 53 in position to receive the grain from said plate 52, a binding and knotting mechanism operating in connection with said table, and a lever mechanism mounted on said first-named frame and connected with said table, for the purpose specified.

8. The combination, with a wheeled frame, a series of fixed knives arranged on the arc of a circle, of a revolving circular platform mounted on said frame, a series of knives provided on the periphery of said platform and arranged to coöperate with said fixed knives, an inclined plate secured above said platform and having its lower edge near the surface thereof, an inclined grain-table slidably supported above said platform and arranged to receive the grain from said plate, a packer mechanism provided above said table and a knotter mechanism operating below said table, and means for operating said packers and knotter mechanism successively.

9. The combination, with a frame, of a series of fixed knives mounted thereon on the arc of a circle, a revolving platform horizontally arranged on said frame, knives provided on the periphery of said platform and arranged to coöperate with said fixed knives, and a rib having a series of notches provided on the surface of said platform near the periphery thereof, for the purpose specified.

10. The combination, with a wheeled frame, of a revolving platform horizontally arranged thereon, fixed and movable knives provided respectively on said frame and said platform, ribs concentrically arranged on said platform, and an inclined horizontally-adjustable grain-table having its lower side near said platform in position to receive the grain therefrom, and a binder mechanism operating in connection with said table.

In witness whereof I have hereunto set my hand this 27th day of July, 1903.

JOHN A. CARLSON.

In presence of—
RICHARD PAUL,
S. V. GRIFFIN.